US010731895B2

(12) United States Patent
Young et al.

(10) Patent No.: US 10,731,895 B2
(45) Date of Patent: Aug. 4, 2020

(54) MOUNTING ADAPTOR FOR MOUNTING A SENSOR ASSEMBLY TO A WATER HEATER TANK (71) Applicant: Ademco Inc., Golden Valley, MN (US)

(72) Inventors: Gregory Young, Blaine, MN (US); Frederick Hazzard, Ham Lake, MN (US); Adam Myre, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 210 days.

(21) Appl. No.: 15/862,259

(22) Filed: Jan. 4, 2018

(65) Prior Publication Data
US 2019/0203978 A1  Jul. 4, 2019

(51) Int. Cl.
*F24H 9/20* (2006.01)
*G01K 1/02* (2006.01)
*F24D 19/10* (2006.01)

(52) U.S. Cl.
CPC ....... *F24H 9/2021* (2013.01); *F24D 19/1051* (2013.01); *G01K 1/024* (2013.01); *F24D 2220/042* (2013.01)

(58) Field of Classification Search
CPC .................................................... F24H 9/2021
See application file for complete search history.

(56) References Cited

U.S. PATENT DOCUMENTS 2,107,468 A * 2/1938 Canuteson ............. G01K 13/12
374/157
3,508,976 A * 4/1970 Parker, Jr. ............... H01L 35/32
136/234

3,847,350 A  11/1974 Thompson
3,849,350 A  11/1974 Matsko
4,324,944 A   4/1982 Weihrich et al.
RE30,936 E    5/1982 Kmetz et al.
(Continued)

FOREIGN PATENT DOCUMENTS

EP  0356609 A1  3/1990
EP  0699316 B1  7/1999
(Continued)

OTHER PUBLICATIONS

Lennox, "Network Control Panel, User's Manual," 18 pages, Nov. 1999.

(Continued)

*Primary Examiner* — Nathaniel Herzfeld
(74) *Attorney, Agent, or Firm* — Shumaker & Sieffert, P.A.

(57) ABSTRACT

Apparatus and method for mounting a non-immersion type temperature sensor to a tank, such as a water heater tank, that is designed for an immersion-type temperature sensor. In one example, a mounting adaptor may include a proximal cavity extending from a proximal end toward a distal end and a distal cavity extending from the distal end toward the proximal end. A wall fluidly isolates the proximal cavity from the distal cavity. The mounting adaptor is mounting to the mounting spud of an immersion type water heater tank, such that the distal cavity of the mounting adaptor is filled with water from the water heater tank. A non-immersion type temperature sensor is positioned adjacent to or in the proximal cavity and in thermal communication with the water in the distal cavity.

20 Claims, 8 Drawing Sheets

(56) References Cited

U.S. PATENT DOCUMENTS

| | | | |
|---|---|---|---|
| 4,333,002 A | 6/1982 | Kozak | |
| 4,467,178 A | 8/1984 | Swindle | |
| 4,508,261 A | 4/1985 | Blank | |
| 4,511,790 A | 4/1985 | Kozak | |
| 4,568,821 A | 2/1986 | Boe | |
| 4,575,705 A * | 3/1986 | Gotcher | G01K 13/02 338/229 |
| 4,588,875 A | 5/1986 | Kozak et al. | |
| 4,692,598 A | 9/1987 | Yoshida et al. | |
| 4,696,639 A | 9/1987 | Bohan, Jr. | |
| 4,734,658 A | 3/1988 | Bohan, Jr. | |
| 4,742,210 A | 5/1988 | Tsuchiyama et al. | |
| 4,770,629 A | 9/1988 | Bohan, Jr. | |
| 4,830,515 A * | 5/1989 | Cortes | G01K 1/14 136/221 |
| 4,834,284 A | 5/1989 | Vandermeyden | |
| 4,842,418 A * | 6/1989 | Conti | G01K 13/125 374/139 |
| 4,929,092 A * | 5/1990 | Taguchi | G01K 1/18 338/239 |
| 4,944,454 A | 7/1990 | Widemann et al. | |
| 4,984,981 A | 1/1991 | Pottebaum | |
| 4,986,468 A | 1/1991 | Deisinger | |
| 5,007,156 A | 4/1991 | Hurtgen | |
| 5,103,078 A | 4/1992 | Boykin et al. | |
| 5,442,157 A | 8/1995 | Jackson | |
| 5,448,038 A | 9/1995 | Kim | |
| 5,577,841 A * | 11/1996 | Wall | G01N 1/125 374/140 |
| 5,622,200 A | 4/1997 | Schulze | |
| 5,660,328 A | 8/1997 | Momber | |
| 5,779,143 A | 7/1998 | Michaud et al. | |
| 5,797,358 A | 8/1998 | Brandt et al. | |
| 5,896,089 A | 4/1999 | Bowles | |
| 5,951,165 A * | 9/1999 | Platt | G01K 1/16 136/230 |
| 5,968,393 A | 10/1999 | Demaline | |
| 5,975,884 A | 11/1999 | Dugger | |
| 6,053,130 A | 4/2000 | Shellenberger | |
| 6,059,195 A | 5/2000 | Adams et al. | |
| 6,069,998 A | 5/2000 | Barnes et al. | |
| 6,075,923 A | 6/2000 | Wu | |
| 6,208,806 B1 | 3/2001 | Langford | |
| 6,212,894 B1 | 4/2001 | Brown et al. | |
| 6,261,087 B1 | 7/2001 | Bird et al. | |
| 6,271,505 B1 | 8/2001 | Henderson | |
| 6,293,471 B1 | 9/2001 | Stettin et al. | |
| 6,350,967 B1 | 2/2002 | Scott | |
| 6,363,218 B1 | 3/2002 | Lowenstein et al. | |
| 6,367,974 B1 * | 4/2002 | Lin | G01K 1/10 374/150 |
| 6,375,087 B1 | 4/2002 | Day et al. | |
| RE37,745 E | 6/2002 | Brandt et al. | |
| 6,560,409 B2 | 5/2003 | Troost, IV | |
| 6,633,726 B2 | 10/2003 | Bradenbaugh | |
| 6,701,874 B1 | 3/2004 | Schultz et al. | |
| 6,795,644 B2 | 9/2004 | Bradenbaugh | |
| 6,861,621 B2 | 3/2005 | Ghent | |
| 6,880,493 B2 | 4/2005 | Clifford | |
| 6,934,862 B2 | 8/2005 | Sharood et al. | |
| 6,936,798 B2 | 8/2005 | Moreno | |
| 6,955,301 B2 | 10/2005 | Munsterhuis et al. | |
| 6,959,876 B2 | 11/2005 | Chian et al. | |
| 7,088,238 B2 | 8/2006 | Karaoguz et al. | |
| 7,117,825 B2 | 10/2006 | Phillips | |
| 7,221,862 B1 | 5/2007 | Miller et al. | |
| 7,252,502 B2 | 8/2007 | Munsterhuis | |
| 7,317,265 B2 | 1/2008 | Chian et al. | |
| 7,726,876 B2 | 6/2010 | Laverdiere et al. | |
| 8,245,987 B2 | 8/2012 | Hazzard et al. | |
| 8,337,081 B1 | 12/2012 | Holmberg et al. | |
| 9,249,987 B2 | 2/2016 | Foster et al. | |
| 9,310,098 B2 | 4/2016 | Buescher et al. | |
| 9,476,599 B2 | 10/2016 | Morris et al. | |
| 9,829,365 B2 * | 11/2017 | Olszewski | G01F 23/242 |
| 2004/0042772 A1 | 3/2004 | Whitford et al. | |
| 2004/0267385 A1 | 12/2004 | Lingemann | |
| 2005/0077368 A1 | 4/2005 | Zak et al. | |
| 2005/0147401 A1 | 7/2005 | Baxter | |
| 2005/0147402 A1 | 7/2005 | Baxter | |
| 2005/0150967 A1 | 7/2005 | Chapman, Jr. et al. | |
| 2006/0243816 A1 | 11/2006 | Teti | |
| 2007/0023333 A1 | 2/2007 | Mouhebaty et al. | |
| 2007/0034169 A1 | 2/2007 | Phillips | |
| 2007/0191994 A1 | 8/2007 | Patterson et al. | |
| 2007/0246551 A1 | 10/2007 | Phillips et al. | |
| 2007/0295823 A1 | 12/2007 | Yamada et al. | |
| 2008/0023564 A1 | 1/2008 | Hall | |
| 2008/0188995 A1 | 8/2008 | Hotton et al. | |
| 2008/0205481 A1 | 8/2008 | Faries et al. | |
| 2008/0216580 A1 | 9/2008 | Kuznia et al. | |
| 2009/0309603 A1 | 12/2009 | Harada et al. | |
| 2010/0095906 A1 | 4/2010 | Leeland et al. | |
| 2011/0122918 A1 | 5/2011 | Murray | |
| 2011/0147549 A1 | 6/2011 | Hazzard et al. | |
| 2011/0147552 A1 | 6/2011 | Hazzard et al. | |
| 2012/0017708 A1 | 1/2012 | Pohle et al. | |
| 2014/0144395 A1 | 5/2014 | Blessing et al. | |
| 2015/0034171 A1 | 2/2015 | Morris et al. | |
| 2016/0003685 A1 | 1/2016 | Walla et al. | |

FOREIGN PATENT DOCUMENTS

| | | |
|---|---|---|
| GB | 2211331 A | 6/1989 |
| JP | 8264469 A | 10/1996 |
| JP | 10221179 A | 8/1998 |
| JP | 2008008548 A | 1/2008 |

OTHER PUBLICATIONS

Moog, "M3000 Control System, RTEMP 8, Remote 8-Channel Temperature Controller with CanOpen Interface," 6 pages, Nov. 2004.

Rheem, "Electric Residential Water Heaters Single and Double Element Models", Use & Care Manual, AP9029-12, 24 pages, Jan. 2015.

U.S. Appl. No. 10/911,151, filed Aug. 3, 2004.

\* cited by examiner

MOUNTING ADAPTOR FOR MOUNTING A SENSOR ASSEMBLY TO A WATER HEATER TANK

TECHNICAL FIELD

The disclosure relates generally to water heaters, and more particularly, to techniques for mounting sensor assemblies to a water heater tank.

BACKGROUND

It is often desirable to obtain a measure of the temperature of a fluid (e.g. a liquid or gas) inside of an enclosed tank, such as a water heater tank. While water heaters are described below as one example application, it should be recognized that there are many other applications where it may be desirable to obtain a measure of the temperature of a fluid inside of an enclosed tank or pipe. For example, in some industrial applications, it may be desirable to obtain a measure of the temperature of a fluid passing through a supply pipe that is supplying a constituent to an industrial process. In another example, in a food processing application, it may be desirable to obtain a measure of the temperature of a fluid that is in a distilling tower or a fermenting vat. These are just some examples.

Water heaters are used in homes, businesses and just about any establishment having the need for heated water. A conventional water heater typically has at least one heating element or "heater," such as a gas-fired and/or electric burner. Each water heater also typically has at least one thermostat or controller for controlling the heater. The controller typically receives signals related to the temperature of the water within the water heater tank, often from a temperature sensor that is thermally engaged with the water in the water heater tank.

In some instances, a water heater may operate in accordance with a first temperature set point and a second temperature set point. The difference between the first and second temperature set point may be referred to as the temperature differential of the water heater. When temperature signals from the temperature sensor indicate that the water temperature is below the first set point, for example when the water temperature is below about 120° F., the controller may turn on the heater and the water within the water heater tank begins to heat. After some time, the water temperature within the water heater tank will increase to the second set point, which, for example may be about 140° F. At this point, the controller may cause the heater to reduce its heat output or, alternatively, causes the heater to turn off. This heat cycle begins again when the water temperature within the water heater tank cools down below the first set point.

For a gas fired water heater, a temperature sensor, a gas valve and a controller are often mounted relative to the water heater tank. The controller typically receives a temperature signal from the temperature sensor. In some cases, the temperature sensor may protrude into and may be thermally coupled to the water in the water heater tank. The controller typically is programmed to control the gas valve such that the temperature of the water in the water heater tank remains between the first and second temperature set points, as described above. For an electric water heater, a temperature sensor, a power delivery unit and a controller may be mounted to the water heater tank. In this case, the controller may control the power delivery unit such that the temperature of the water in the water heater tank is kept between the first and second temperature set points as described above.

In some water heater applications, the temperature sensor may be an immersion-type temperature sensor that, when installed, is immersed in the water in the water tank to maximize conductive and convective heat transfer with the water in the water heater tank. Such placement of the temperature sensor may allow for direct contact with the water in the water heater tank, and consequently a fairly accurate measure of water temperature. However, immersion-type temperature sensors typically require a through-hole through the wall of the water tank to accept the temperature sensor and a waterproof seal between the temperature sensor and the water heater tank. Also, if the sensor fails and needs to be replaced, the water must typically be drained from the water heater tank.

In some applications, the temperature sensor may be a non-immersion-type temperature sensor that is not immersed in the water of the water heater tank, but rather senses the water temperature from outside of the water heater tank. In some cases, a non-immersion-type temperature sensor may be placed adjacent to an outer wall of the water heater tank, and no through-hole through the wall of the water heater tank is required. Because there is no through-hole, non-immersion type temperature sensors can often be removed and replaced without draining the water from the water heater tank. What would be desirable is a device and method for mounting a non-immersion type temperature sensor to a tank, such as a water heater tank, that is designed for an immersion-type temperature sensor. This may allow, for example, a contractor to carry just non-immersion type temperature sensors yet still be able to service water heater design for non-immersion type temperature sensors and water heaters designed for immersion type temperature sensors.

SUMMARY

The present disclosure relates generally to mounting sensor assemblies to tanks or pipes, and more particularly, to mounting non-immersion type temperature sensor relative to a tank or pipe configured for an immersion type temperature sensor. While water heaters are described below as one example application, it should be recognized that there are many other applications where it may be desirable to obtain a measure of the temperature of a fluid inside of an enclosed tank. In one example, a mounting adaptor may be configured to mount a non-immersion sensor assembly to a water heater tank that has a through hole into the water heater tank and a corresponding mounting spud for mounting an immersion sensor assembly to the water heater tank with the immersion sensor assembly extending through the through hole and immersed in the water in the water heater tank. The mounting adaptor may include a proximal end and an opposing distal end. A proximal cavity may extend from the proximal end toward the distal end and a distal cavity may extend from the distal end toward the proximal end. A wall may fluidly isolate the proximal cavity from the distal cavity. The proximal cavity may be configured to receive at least part of the non-immersion sensor assembly. The mounting adaptor may further include a mounting structure that may be configured to couple the mounting adaptor to the mounting spud of the water heater tank such that the distal cavity of the mounting adaptor is exposed to water in the water heater tank via the through hole into the water heater tank.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following description of various illustrative embodiments in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular illustrative embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

It is often desirable to obtain a measure of the temperature of a fluid (e.g. a liquid or gas) inside of an enclosed tank, such as a water heater tank. While water heaters are described below as one example application, it should be recognized that there are many other applications where it may be desirable to obtain a measure of the temperature of a fluid inside of an enclosed tank or pipe. For example, in some industrial applications, it may be desirable to obtain a measure of the temperature of a fluid passing through a supply pipe that is supplying a constituent to an industrial process. In another example, in a food processing application, it may be desirable to obtain a measure of the temperature of a fluid that is in a distilling tower or a fermenting vat. These are just some examples.

Figure 1:
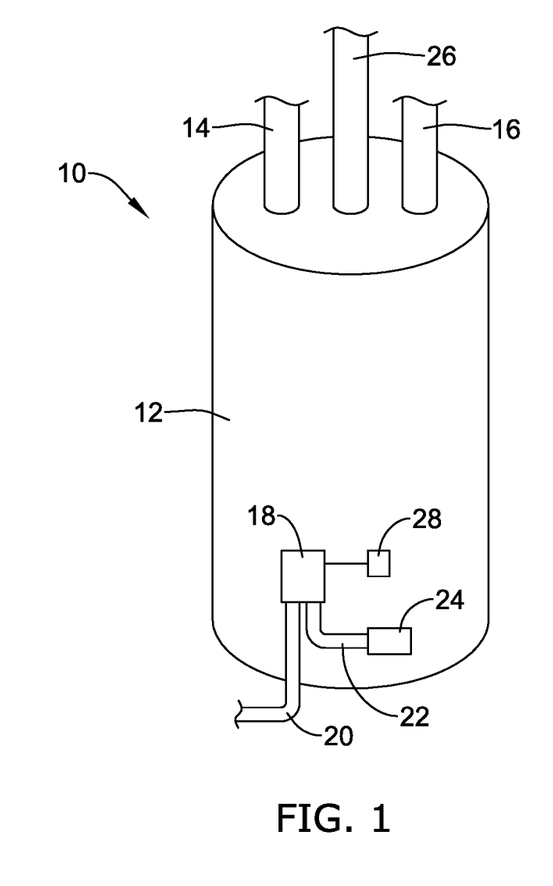
FIG. 1 is a schematic view of an illustrative but non-limiting water heater in accordance with the present disclosure.

FIG. 1 provides a schematic view of an illustrative but non-limiting water heater 10. Illustrative water heater 10 includes a water heater tank 12. The water heater tank 12 may include an insulating layer (not explicitly shown) positioned about the water heater tank 12 to help reduce thermal losses from the water heater tank 12. Cold water enters water heater tank 12 through a cold water line 14 and is heated by a gas burner 24. In some cases, the water heater 10 may include an electric heating element rather than a gas burner 24. A power delivery unit (not shown) may be used to selectively apply power (i.e. current) to the electric heating element. In either case, the resulting heated water exits through a hot water line 16. For gas-fired water heaters, a gas control unit 18, such as a gas valve, regulates gas flow from a gas source 20 through a combustion gas line 22 and into gas burner 24. A flue 26 permits combustion byproducts to safely exit.

As can be seen, water heater 10 may include a temperature sensor 28. In some cases, temperature sensor 28 may enter water heater tank 12 at a location laterally offset from gas control unit 18. In some instances, however, temperature sensor 28 may instead be located behind gas control unit 18, and in some cases, may be supported and retained by a common temperature sensor mounting bracket such as that described more fully below. In some instances, a non-immersion type temperature sensor may be provided. While not explicitly shown, the water heater tank 12 may include a mounting spud 30 (FIG. 3 and FIG. 4) or other feature(s) for mounting a non-immersion type temperature sensor 28 relative to the water heater tank 12. Also, while not explicitly shown in FIG. 1, the water heater tank 12 may include a mounting spud 322 (FIG. 8) or other feature(s) for mounting an immersion type temperature sensor (not explicitly shown) relative to the water heater tank 12.

Figure 2:
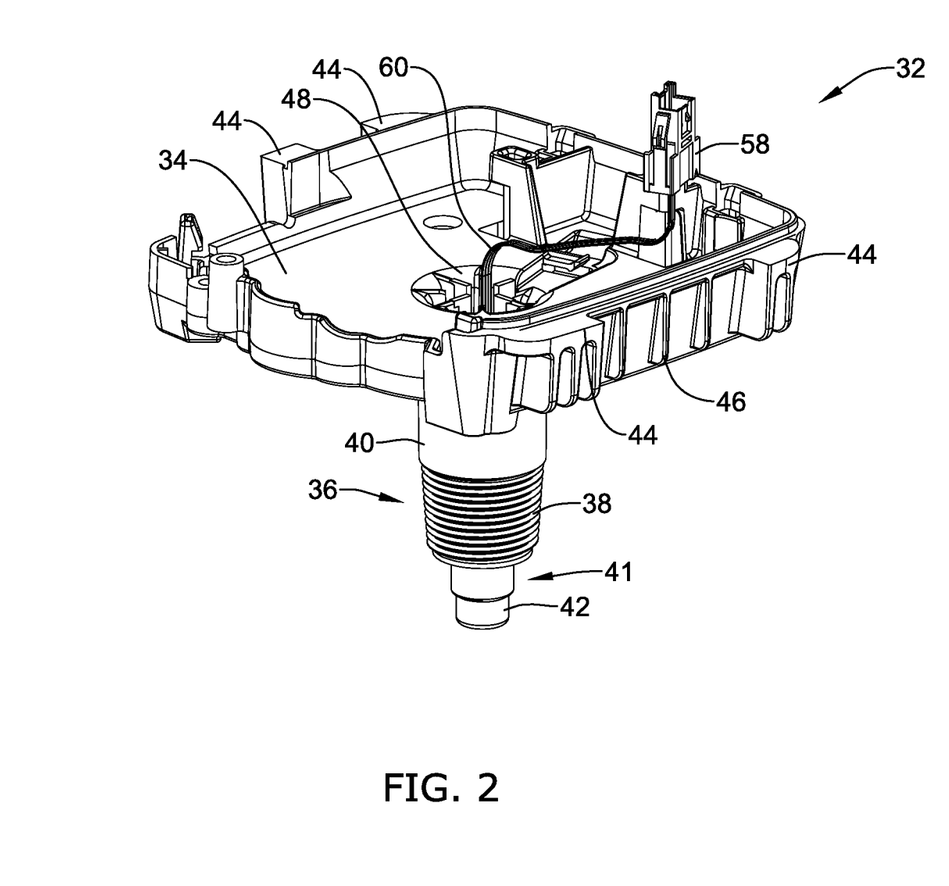
FIG. 2 is a perspective view of an illustrative but non-limiting temperature sensor mounting bracket that may be used in conjunction with the water heater of FIG. 1.

FIG. 2 is a perspective view of an illustrative but non-limiting temperature sensor mounting bracket 32 that may be used in conjunction with the water heater 10. The temperature sensor mounting bracket 32, in combination with the threaded spud 30 (see FIG. 3) may position a temperature sensor assembly 41 in a relatively precise location relative to the outer wall of water heater tank 12 such that water temperature may be accurately and reliably measured and/or calculated. In some instances, the temperature sensor mounting bracket 32 may include a component retaining region 34, and a sensor portion 36 forming an elongated stem extending from the component retaining region 34. In the example shown, temperature sensor mounting bracket 32 may be configured to retain a gas valve module and/or a water heater controller module (not explicitly shown) within component retaining region 34, as well as a temperature sensor assembly 41 (see also FIG. 3) within elongated stem. Component retaining region 34 may form at least a portion of a housing of a gas control unit, such as gas control unit 18 of FIG. 1, but this is not required. In some instances, component retaining region 34 may include an opening 48 connecting the component retaining region 34 to a hollow portion 50 of the sensor portion 36. In some cases, opening 48 may extend from the component retaining region 34 and through the sensor portion 36 to an open end 37 of the sensor portion defining a hollow portion 50.

Temperature sensor mounting bracket 32 may be formed of any suitable material. In some cases, temperature sensor mounting bracket 32 may include non-metallic materials such as a polymeric material, glass, ceramic, plastic, and the like. In some cases, temperature sensor mounting bracket 32 may be manufactured as a single piece by injection molding a nylon material such Hylon®, available from Entec Polymers in Manchester, Tenn. It is contemplated that in some cases, temperature sensor mounting bracket 32 may not be formed entirely from the same material, or temperature sensor mounting bracket 32 may not be formed as a single piece. In some cases, temperature sensor mounting bracket 32 may include metallic materials, if desired.

Figure 8:
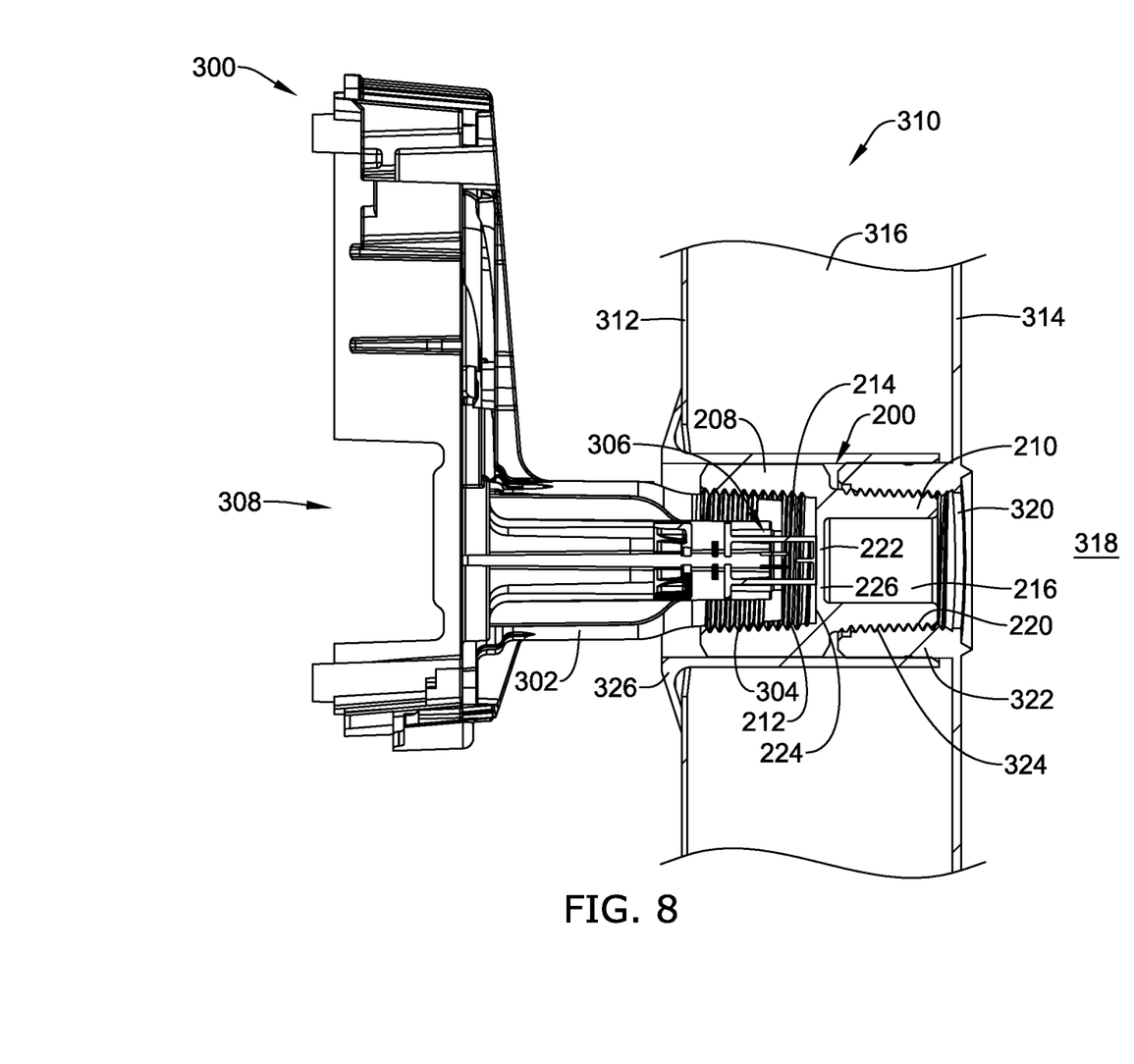
FIG. 8 is a partial cross-sectional view of the illustrative mounting adaptor of FIGS. 6-7 mounting a non-immersion type temperature sensor assembly to an immersion type water heater tank.

In the illustrative embodiment, sensor portion 36 of the temperature sensor mounting bracket 32 may include an elongated stem extending from component retaining region 34. Sensor portion 36 may include an internal hollow portion 50 (shown in more detail in FIG. 3) for slidably receiving a temperature sensor assembly 41. In the embodiment shown, the temperature sensor assembly 41 may extend out of an open end 37 of the sensor portion 36 and away from the component retaining region 34. The elongated stem of sensor portion 36 may include a first portion 40 and a threaded region 38 extending around the exterior of the sensor portion 36. In some instances, as illustrated, threaded region 38 can be used to secure temperature sensor mounting bracket 32 to or within a threaded aperture 31 (FIG. 3) of a water heater spud 30. Alternatively, threaded region 38 can be used to secure temperature sensor mounting bracket 32 to or within a threaded proximal cavity 212 of a mounting adaptor 200, as best shown in FIG. 8. As discussed in more detail below, the sensor portion 36 and temperature sensor assembly 41 may be configured such that when the threaded region 38 is engaged with the threaded water heater spud 30 or mounting adaptor 200, a temperature sensor 52 (see FIG. 3) may be positioned in a relatively precise position relative to the water heater tank 12.

In some embodiments, temperature sensor mounting bracket 32 may also include two (or more) bosses 44 on a first lateral side, and two (or more) bosses 44 on a second opposing lateral side. While temperature sensor mounting bracket 32 is shown having four bosses 44, it is contemplated that temperature sensor mounting bracket 32 may have any number of bosses 44 as desired, for example, but not limited to, one, two, three, or more. Additionally, it is contemplated that bosses 44 may be disposed on fewer than, or more than, two lateral sides. Bosses 44 may provide, among other things, an area for torque to be applied directly to the temperature sensor mounting bracket 32 during installation. For example, an installation tool may grip and apply torque to bosses 44 to threadably engage threaded region 38 of sensor portion 36 with the threaded water heater spud 30 on a water heater tank 12. In some instances, bosses 44 may further include a rib 46 disposed between adjacent bosses 44. Rib(s) 46 may provide additional support to the temperature sensor mounting bracket 32, and may also help prevent an installation tool from contacting the component retaining region 34 of temperature sensor mounting bracket 32 during installation.

Figure 3:
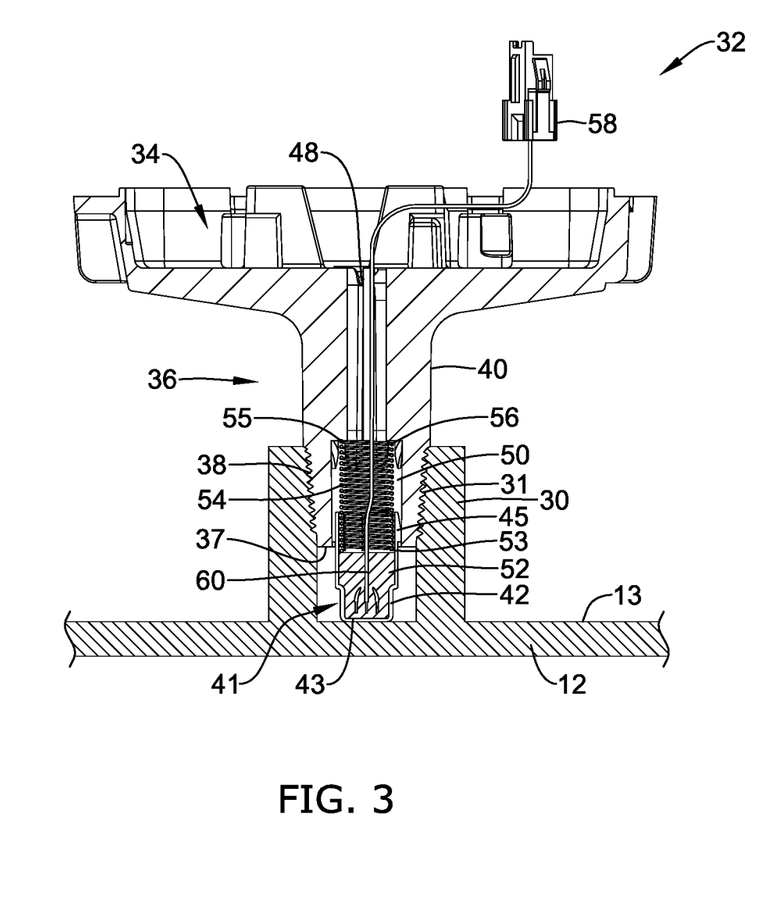
FIG. 3 is a cross-sectional view of an illustrative but non-limiting non-immersion type temperature sensor assembly mounted to a non-immersion type water heater tank.

Turning to FIG. 3, which is a cross-sectional view of an illustrative but non-limiting non-immersion type temperature sensor mounting bracket 32 mounted to a non-immersion type water heater tank 12. The temperature sensor mounting bracket 32 engages a threaded aperture 31 of a water heater spud 30. As discussed above, the water heater tank 12 may include a feature(s) for mounting a non-immersion type temperature sensor mounting bracket 32. For example, the water heater tank 12 may include a spud 30 extending from the outer wall 13 thereof. In a non-immersion type water heater tank 12, no through-hole is provided. In some instances, the spud 30 may include a threaded aperture 31 for mating with the threaded region 38 of the temperature sensor mounting bracket 32. However it is contemplated that other retaining feature(s), such an adhesive, friction fit, snap fit, clips, etc. may be used to secure the temperature sensor mounting bracket 32 to the water heater tank 12.

The temperature sensor assembly 41 positioned by the temperature sensor mounting bracket 32 may include a thermal conduction temperature sensor 52, sometimes disposed within a capsule 42. It is contemplated that the temperature sensor 52 may be of any type desired and is not necessarily limited to a thermal conduction temperature sensor. The temperature sensor 52 may be electrically connected to a control unit (such as gas control unit 18 in FIG. 1) via an electrical cable 60 and connection element 58 (e.g. plug). In the example shown, capsule 42 may have a generally cylindrical shape, although this is not required. It is contemplated that the capsule 42 may have any cross-sectional shape desired such as, but not limited to: rectangular, square, elliptical, polygonal, etc. It is further contemplated that the capsule 42 may be sized and shaped to conform to the shape of the temperature sensor 52. However, it is contemplated that the capsule 42 may take any shape as desired. It is contemplated that while the capsule 42 is illustrated has having a first end 43 with a smaller cross-sectional area, the first end 43 may be similar in size or larger than the second end 45 of the capsule 42.

In some embodiments, capsule 42 may include feature(s) adjacent the second end 45 that are configured to maintain a portion of the temperature sensor assembly 41 within the hollow portion 50 of the sensor portion 36. For example, in some instances, the second end 45 of the capsule 42 may include one or more protrusions extending away from the capsule 42. The one or more protrusions may be configured to engage a mating feature, such as a protrusion adjacent the open end 37 on the sensor portion 36, to maintain the temperature sensor assembly 41 within the hollow portion 50 (e.g. to help ensure that the temperature sensor assembly 41 does not slide out of the open end 37 on the sensor portion 36). It is contemplated that the one or more protrusions may be temporarily deformed to allow the temperature sensor assembly 41 to be initially assembled within the hollow portion 50 of sensor portion 36 by inserting the temperature assembly through the open end 37 and into the hollow portion 50. It is further contemplated that the protrusions may also be temporarily deformed if the temperature sensor 52 and/or temperature sensor assembly 41 need to be removed.

In some instances, the temperature sensor assembly 41 may be slidably disposed within or about the hollow portion 50. In some cases, the sensor portion 36 may include a lip or shelf 55 generally perpendicular to the elongated stem to maintain the temperature sensor assembly 41 within a region of the sensor portion 36 between the shelf 55 and the open end 37. The temperature sensor assembly 41 may be movable within the hollow portion 50 to accommodate various size spuds 30, manufacturing tolerances, equipment variations, and/or other variations as desired. For example, if a shorter spud is used, the second end 45 of the capsule 42 may be positioned closer to the shelf 55, whereas if a longer spud 30 is used, the second end 45 may be positioned further from the shelf 55. The sensor portion 36 may include a compliant body 54, such as a biasing element or spring, configured to maintain the temperature sensor assembly 41 in a proper position. In some cases, it is contemplated that the biasing element 54 may be sized to accommodate various water tank spud 30 lengths.

The biasing element 54 may have a first end 53 configured to engage temperature sensor assembly 41, and a second end 56 configured to contact shelf 55. In some instances, the biasing element 54 may be partially disposed within capsule 42. The biasing element 54 may be configured to bias the temperature sensor assembly 41 away from the shelf 55. When the sensor portion 36 of the temperature sensor mounting bracket 32 is engaged with the water tank spud 30, the biasing element 54 may exert sufficient force to bias the temperature sensor assembly 41 towards the water heater tank 12 such that a first end 43 of the temperature sensor assembly 41 physically contacts the outer wall 13 of the water heater tank 12. Physical contact between the first end 43 of the temperature sensor assembly 41 and the outer wall of the water heater tank 12 may increase thermal conduction between the temperature sensor 52 and the water heater tank 12, which may increase the responsiveness, accuracy and/or reliability of the temperature sensor measurement.

Figure 4:
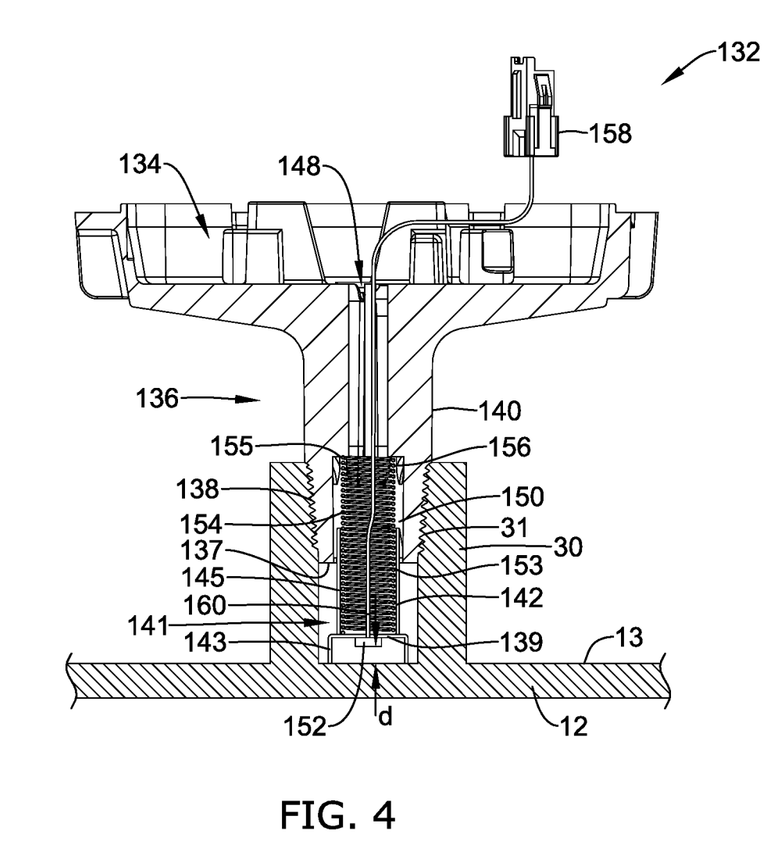
FIG. 4 is a cross-sectional view of another illustrative but non-limiting non-immersion type temperature sensor assembly mounted to a non-immersion type water heater tank.

Turning now to FIG. 4, which is a cross-sectional view of another illustrative but non-limiting non-immersion type temperature sensor assembly mounted to a non-immersion type water heater tank. In FIG. 4, a non-limiting temperature sensor mounting bracket 132 engages a threaded aperture 31 of a water heater spud 30. It is contemplated that the temperature sensor mounting bracket 132 may be similar in form and function to temperature sensor mounting bracket 32 of FIG. 3. For example, while not explicitly shown, the temperature sensor mounting bracket 132 may include bosses and/or ribs to facilitate installation of the temperature sensor mounting bracket 132 and/or to provide additional support. The temperature sensor mounting bracket 132 in combination with the threaded spud 30 may position a temperature sensor assembly 141 in a proper or desired location relative to the water heater tank 12 such that water temperature may be accurately and reliably measured and/or calculated.

In some instances, the temperature sensor mounting bracket 132 may include a component retaining region 134, and a sensor portion 136 extending from the component retaining region 134 forming an elongated stem. In the illustrative embodiment, temperature sensor mounting bracket 132 may be configured to retain a gas valve module and/or a water heater controller module (not explicitly shown) within component retaining region 134, as well as a temperature sensor assembly 141 within elongated stem of sensor portion 136. Component retaining region 134 may form at least a portion of a housing of a gas control unit, such as gas control unit 118 of FIG. 1, but this is not required. In some instances, component retaining region 134 may include an opening 148 connecting the component retaining region 134 a hollow portion 150 of the sensor portion 136. Opening 148 may extend from the component retaining region 134 and through the sensor portion 136 to an open end 137 of the sensor portion defining a hollow portion 150.

Temperature sensor mounting bracket 132 may be formed of any suitable material. In some cases, temperature sensor mounting bracket 132 may include non-metallic materials such as a polymeric material, glass, ceramic, plastic, and the like. In some cases, temperature sensor mounting bracket 132 may be manufactured as a single piece by injection molding a nylon material such Hylon®, available from Entec Polymers in Manchester, Tenn. It is contemplated that in some cases, temperature sensor mounting bracket 132 may not be formed entirely from the same material, or temperature sensor mounting bracket 132 may not be formed as a single piece. In some cases, temperature sensor mounting bracket 132 may include metallic materials, if desired.

In the illustrative embodiment, sensor portion 136 of the temperature sensor mounting bracket 132 may include an elongated stem extending from component retaining region 134. Sensor portion 136 may include an internal hollow portion 150 for slidably receiving a temperature sensor assembly 141. In the example shown, the temperature sensor assembly 141 may extend out of an open end 137 of the sensor portion 136 and away from the component retaining region 134. The elongated stem of sensor portion 136 may include a first portion 140 and a threaded region 138 extending around the exterior of the sensor portion 136. In some instances, as illustrated, threaded region 138 can be used to secure temperature sensor mounting bracket 132 to or within a threaded aperture 131 of a water heater spud 130. Alternatively, threaded region 138 can be used to secure temperature sensor mounting bracket 132 to or within a threaded cavity 212 of a mounting adaptor 200 as best shown in FIG. 8. As discussed in more detail herein, the sensor portion 136 and temperature sensor assembly 141 may be configured such that when the threaded region 138 is engaged with the threaded water heater spud 130 or mounting adaptor 200, a temperature sensor 152 may be positioned in a relatively precise position relative to the water heater tank 12.

It is contemplated that the temperature sensor assembly 141 may include an infrared (IR) temperature sensor 152 disposed within and attached to a capsule 142. It is contemplated that the temperature sensor 152 may be of any type desired and is not necessarily limited to an IR temperature sensor. The temperature sensor 152 may be electrically connected to a control unit (such as gas control unit 18 in FIG. 1) via an electrical cable 160 and connection element 158 (e.g. plug). Capsule 142 may include a first portion 145 having a first cross sectional area and a second portion 143 having a second cross-sectional area. In some instances, the second cross-sectional area may be larger than the first cross-sectional area, although this is not required. It is contemplated that in some instances, the first portion 145 may have a cross-section that is similar in size or smaller than the cross-section of the second portion 143. It is contemplated that the capsule may have any cross-sectional shape desired such as, but not limited to: rectangular, square, elliptical, polygonal, etc. In some instances, the cross-sectional shapes of the first portion 145 and the second portion 143 may be different. For example, in some embodiments, the first portion 145 may have a generally circular cross-sectional shape while the second portion 143 may have a generally square cross-sectional shape. In other embodiments, the cross-sectional shapes of the first and second portions 145, 143 may be the same or similar. In some embodiments, the first and second portions 145, 143 may be formed from a single piece or a unitary structure. In other embodiments, the first and second portions 145, 143 may be separate components. The first and second portions 145, 143 may be attached in any manner known in the art, such as, but not limited to, welding, brazing, soldering, adhesive, friction fit, snap fit, fasteners, etc.

In some embodiments, the second portion 143 may include a generally solid end 139 adjacent to the first portion 145 of the capsule 142. Temperature sensor 152 may be mounted or otherwise affixed to the solid end 139 such that the temperature sensor 152 faces a water heater tank 12 when the temperature sensor mounting bracket 132 is engaged with a water tank spud 30. Temperature sensor 152 may be mounted to the capsule 142 such that the temperature sensor 152 is partially enclosed within the capsule 142, but this is not required. It is contemplated that the second portion 143 may be sized such that a when the temperature sensor mounting bracket 132 is engaged with a water tank spud 30, the temperature sensor 152 is spaced a predetermined distance 'd' from the outer wall 13 of the water heater tank 12, as shown in FIG. 4. For example, the temperature sensor 152 may be positioned approximately 0.10 inches, 0.25 inches, anywhere between 0.10 inches and 0.25 inches, or any other suitable distance from the outer wall 13 of the water heater tank 12. Capsule 142 may be formed from a relatively non-compliant and/or relatively non-deformable material such that when a biasing force is exerted on the capsule 142 by biasing member 154, the capsule 142 resists deformation and maintains the temperature sensor 152 at a fixed distance from the outer wall 13 of the water heater tank 12.

In some instances, capsule 142 may include features adjacent the first portion 145 thereof that are configured to maintain a portion of the temperature sensor assembly 141 within the hollow portion 150 of the sensor portion 136. For example, in some cases, the first portion 145 of the capsule 142 may include one or more protrusions extending away from the capsule 142. The one or more protrusions may be configured to engage a mating feature such as a protrusion adjacent the open end 137, on the sensor portion 136 to maintain the temperature sensor assembly 141 within the hollow portion 150. It is contemplated that the one or more protrusions may be temporarily deformed to allow the temperature sensor assembly 141 to be assembled within the hollow portion 150 of sensor portion 136 by inserting the temperature assembly through the open end 137 and into the hollow portion 150. It is further contemplated that the protrusions may also be temporarily deformed if the temperature sensor 152 and/or temperature sensor assembly 141 needs to be removed.

In some instances, the temperature sensor assembly 141 may be slidably disposed within or about the hollow portion 150. The sensor portion 136 may include a lip or shelf 155 generally perpendicular to the elongated stem to maintain the temperature sensor assembly 141 within a region of the sensor portion 136 between the shelf 155 and the open end 137. The temperature sensor assembly 141 may be movable within the hollow portion 150 to accommodate various size spuds 30. For example, if a shorter spud is used, the first portion 145 of the capsule 142 may be positioned closer to the shelf 155, whereas if a longer spud 30 is used, the first portion 145 may be positioned further from the shelf 155. The sensor portion 136 may further include a compliant body 154, such as a biasing element or spring, configured to maintain the temperature sensor assembly 141 in a specified position. It is contemplated that the biasing element 154 may be sized to accommodate various water tank spud 30 lengths. For example, the biasing element 154 may have a first end 153 configured to contact the generally solid end 139 of the capsule 142 and a second end 156 configured to contact shelf 155. In some instances, the biasing element 154 may be partially disposed within capsule 142. The biasing element 154 may be configured to bias the temperature sensor assembly 141 away from the shelf 155. When the sensor portion 136 of the temperature sensor mounting bracket 132 is engaged with the water tank spud 30, the biasing element 154 may be configured to bias the temperature sensor assembly 141 towards the water heater tank 12 such that a second portion 143 of the capsule 142 physically contacts the outer wall 13 of the water heater tank 12. The biasing element 154 may exert sufficient force on the temperature sensor assembly 141 to continually bias the temperature sensor assembly 141 towards the outer wall 13 of the water heater tank 12. Physical contact between the second portion 143 of the capsule 142 and the outer wall 13 of the water heater tank 12 may maintain the temperature sensor 152 a fixed distance 'd' from the outer wall 13 of the water heater tank 12 such that water temperature may be accurately and reliably measured and/or calculated.

Figure 5:
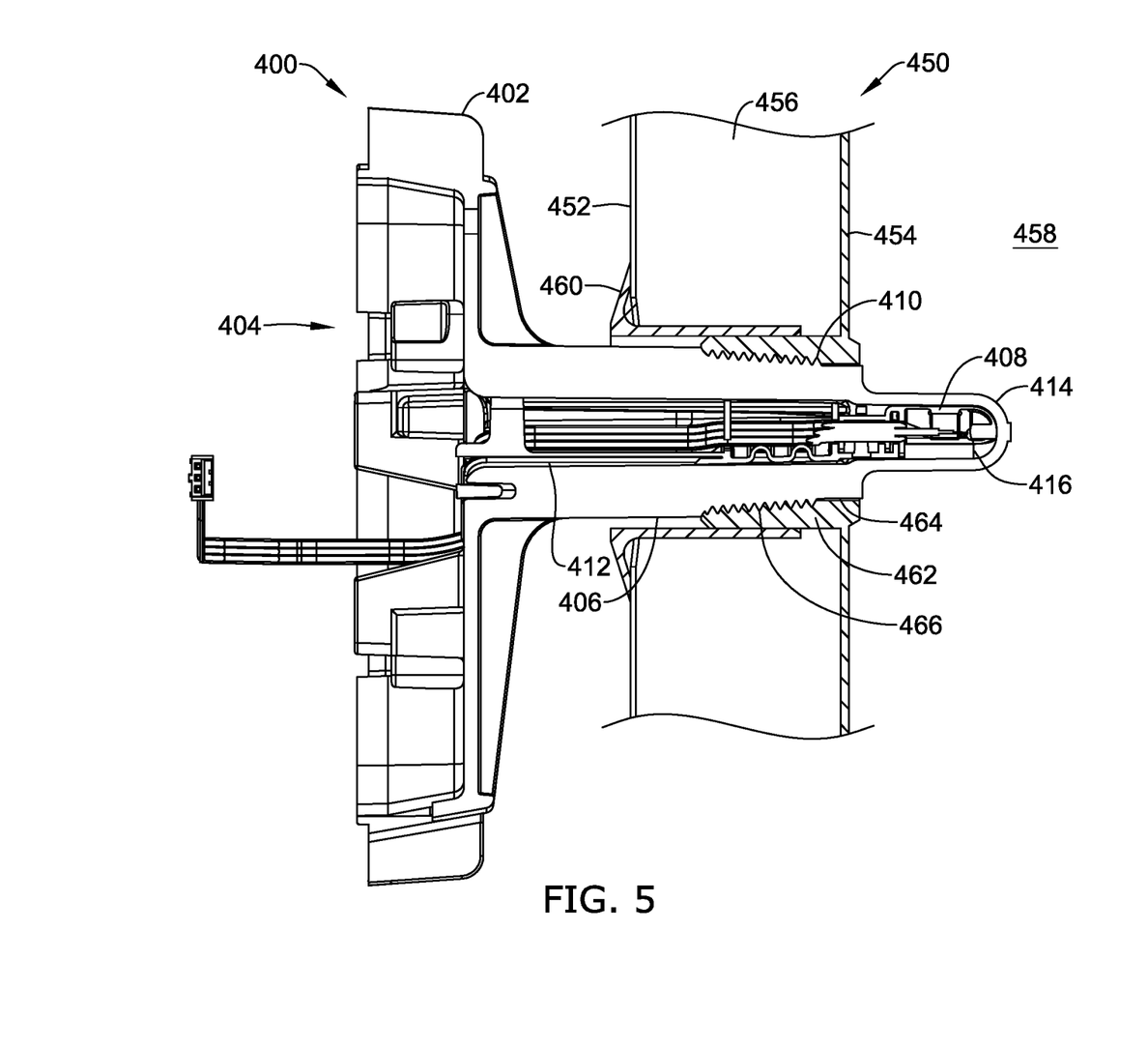
FIG. 5 is a cross-sectional view of an illustrative but non-limiting immersion type temperature sensor assembly mounted to an immersion type water heater tank.

FIG. 5 is a cross-sectional view of an illustrative but non-limiting immersion type temperature sensor assembly 400 mounted to an immersion type water heater tank 450. The water tank 450 may be formed from an outer insulating shell 452 and an inner water holding tank wall 454. A layer of insulation 4566 may be positioned between the shell 452 and the tank 454. Water 458 is stored within the tank 454. A through-hole 464 may extend from an inner surface of the tank wall 454 to an outer surface of the tank wall 454 to fluidly couple the storage tank 450 to a mounting spud 462 and provide access for an immersion type temperature sensor 400. The mounting spud 462 may be configured to couple with an immersion type temperature sensor. For example, the mounting spud 462 may include a plurality of internal threads 466 configured to engage an immersion temperature sensor assembly and to bring the immersion temperature sensor assembly into fluid contact with the water 458 within the tank 450.

The immersion type temperature sensor 400 may include a temperature sensor mounting bracket 402 having a component retaining region 404 and a sensor portion 406 forming an elongated stem. Temperature sensor mounting bracket 402 may be configured to retain a gas valve module and/or a water heater controller module (not explicitly shown) within component retaining region 404, as well as a temperature sensor assembly 408 (within elongated stem 406). In the illustrative embodiment, temperature sensor mounting bracket 402 includes a gas valve retaining portion 404 and a sensor portion 406. Gas valve retaining portion 404 may form at least a portion of a housing of a gas control unit, such as gas control unit 18 of FIG. 1, but this is not required. In some instances, as illustrated, elongated sensor portion 406 may include a threaded portion 410 that can be used to secure bracket 402 to or within aperture of water heater spud 462.

Temperature sensor mounting bracket 402 may be formed of any suitable material. In some cases, temperature sensor mounting bracket 402 may include non-metallic materials such as a polymeric material, glass, ceramic, plastic, and the like. In some cases, temperature sensor mounting bracket 402 may be manufactured as a single piece by injection molding a nylon material such Hylon®, available from Entec Polymers in Manchester, Tenn. The thermal conductivity of such non-metallic materials may be less than those of metallic materials, and as a result, may partially thermally isolate the temperature sensor assembly 408 from the water in the water tank 450, but may be less expensive to produce than a metallic well. It is contemplated that in some cases, temperature sensor mounting bracket 402 may not be formed entirely from the same material, or temperature sensor mounting bracket 402 may not be formed as a single piece.

Sensor portion 406 of the temperature sensor mounting bracket 402 may include an elongated stem extending from component retaining region 404. Sensor portion 406 may include an internal well 412 for receiving a temperature sensor assembly 408. The elongated stem of sensor portion 406 may include several different regions. Threaded region 410 may be configured to threadably engage a threaded spud 462 in the water tank 450. When threaded region 410 is engaged with the threaded water heater spud, distal end 414 may be disposed within the water in the water tank 450. Distal end 414 may house a temperature sensor 416 such that when the temperature sensor mounting bracket 402 is engaged with the water tank 450, the temperature sensor is in at least partial thermal contact with the water 458 in the water tank 450. Some illustrative immersion type temperature sensor assemblies are described in commonly assigned U.S. Pat. No. 8,245,987 entitled MOUNTING BRACKET FOR USE WITH A WATER HEATER and U.S. Pat. No. 9,249,987 entitled MOUNTING BRACKET FOR USE WITH A WATER HEATER the entirety of which are hereby incorporated by reference.

Figure 6:
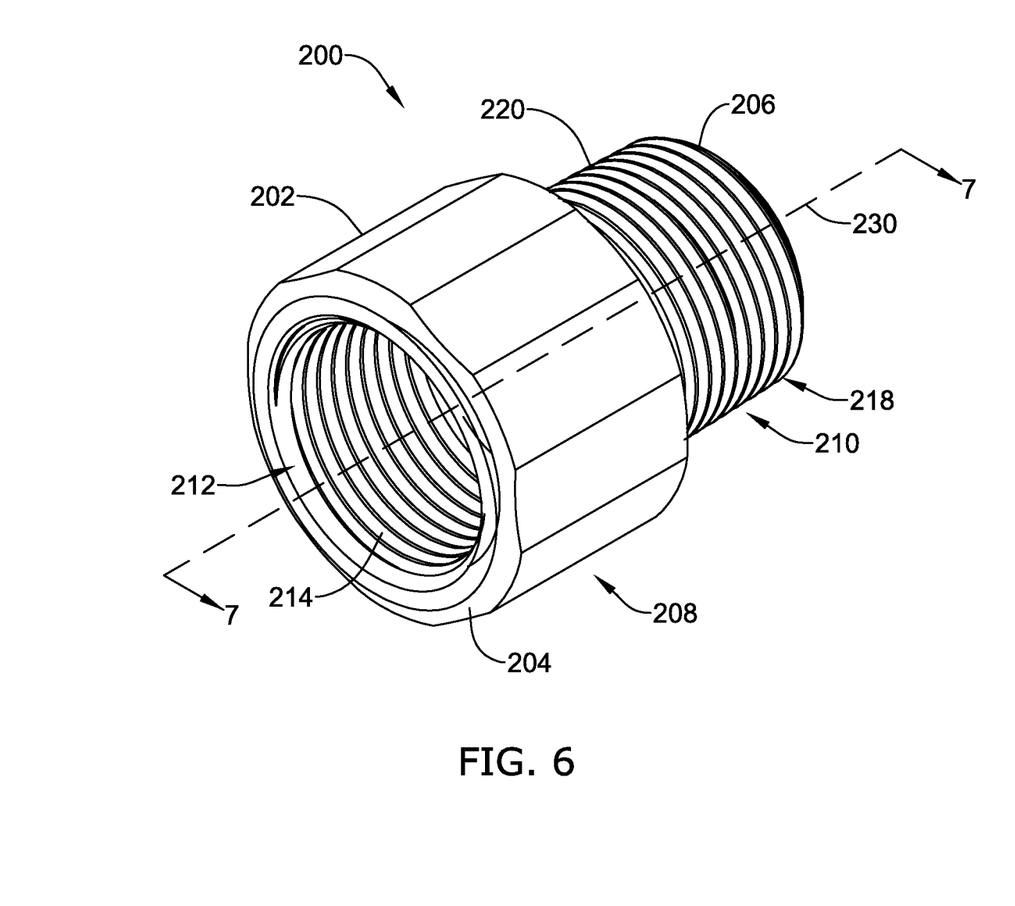
FIG. 6 is a perspective view of an illustrative but non-limiting mounting adaptor for mounting a non-immersion type temperature sensor assembly to an immersion type water heater tank.

The temperature sensor mounting brackets 32, 132 may be configured to mount a non-immersion temperature sensor assembly to a tank, or other component. Temperature sensor mounting bracket 402 may be configured to mount an immersion temperature sensor assembly to a tank, or other component. In some instances, it may be desirable to use a non-immersion type temperature sensor assembly on tanks or components that are intended to have an immersion type temperature sensor assembly. FIG. 6 is a perspective view of an illustrative mounting adaptor 200 configured to mount a non-immersion temperature sensor assembly and/or temperature sensor mounting bracket 32, 132 to a mounting spud of an water tank configured for use with an immersion style temperature sensor. In the example shown, the mounting adaptor 200 may have an elongated body portion 202 extending along a longitudinal axis 230 from a proximal end 204 to an opposing distal end 206. The elongated body portion 202 may have a proximal sensor portion 208 adjacent to the proximal end 204 and a distal portion 210 adjacent to the distal end 206. In some cases, the proximal portion 208 may have an outer diameter greater than an outer diameter of the distal portion 210, although this is not required. It is contemplated that the outer (and/or inner diameters) of the proximal and/or distal portions 208, 210 may vary with the mounting structure (e.g., coupling mechanisms) used to secure the mounting adaptor 200 to a non-immersion sensor assembly (e.g., such as the sensor portions 36, 136 and/or temperature sensor assemblies 41, 141) and the mounting spud 322 of an immersion type water heater tank.

A first or proximal cavity 212 extends from the proximal end 204 towards the distal end 206. The proximal cavity 212 may be configured to releasably couple the mounting adaptor 200 to a non-immersion temperature mounting bracket 300 (see, for example, FIG. 8). In some cases, the surface of the proximal cavity 212 (e.g., an inner surface of the proximal portion 208) may include a plurality of threads 214 configured to threadably engage a plurality of threads (for example, outer threaded regions 38, 138) on a non-immersion sensor assembly. However it is contemplated that the other retaining feature(s), such an adhesive, friction fit, snap fit, clips, etc. may be used to secure the non-immersion temperature sensor mounting bracket 300 to the proximal end 204 of the mounting adaptor 200.

The distal portion 210 of the elongated body portion 202 may include a mounting structure 218 configured to couple the mounting adaptor 200 to the mounting spud 322 (see, for example, FIG. 8) of an immersion type water heater tank. In some cases, the mounting structure 218 may include a plurality of threads 220 on an outer surface of the mounting adaptor 200. The plurality of threads 220 may be configured to cooperate with and form a water tight seal with the mounting spud 322 of an immersion type water heater tank 310. However it is contemplated that the other retaining feature(s), such an adhesive, friction fit, snap fit, clips, etc. may be used to secure the mounting adaptor 200 to the mounting spud 322.

Figure 7:
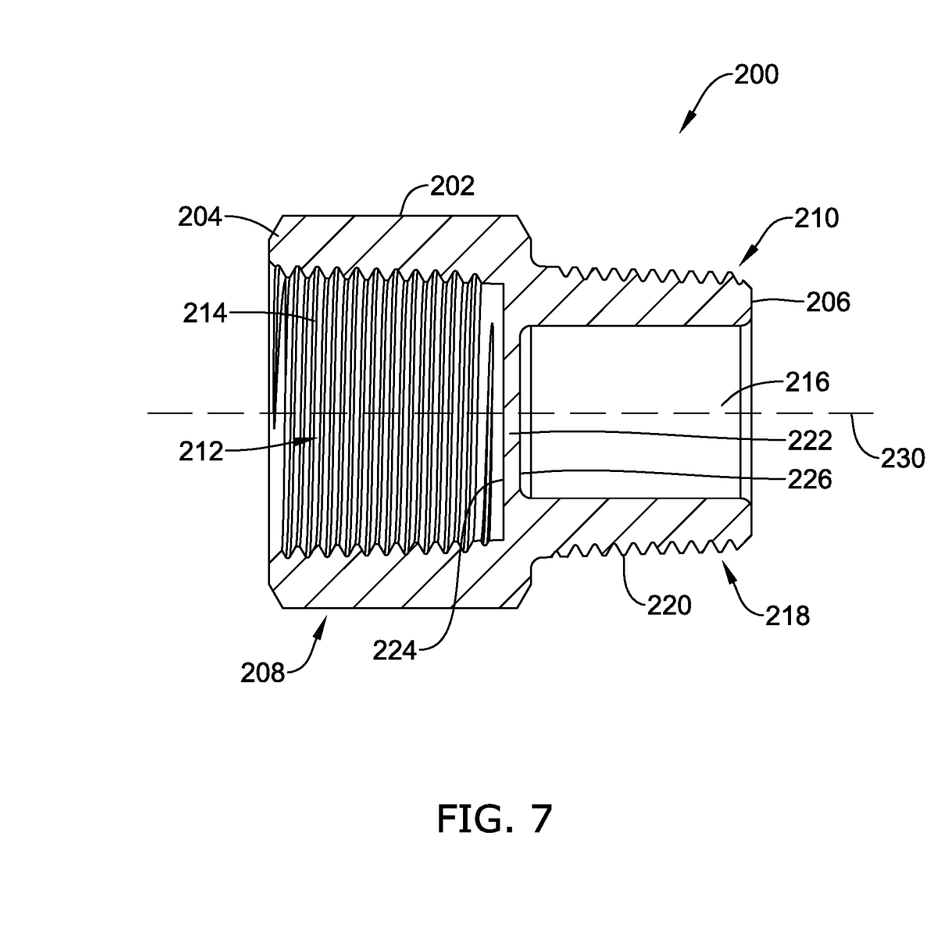
FIG. 7 is a cross-sectional view of the illustrative mounting adaptor of FIG. 6.

Referring to FIG. 7, which illustrates a cross-sectional view of the illustrative mounting adaptor 200 taken along line 7-7 in FIG. 6. In the example shown, a second or distal cavity 216 extends from the distal end 206 towards the proximal end 204. The distal cavity 216 may be configured to be exposed to water in the immersion type water heater tank 310. A divider or wall 222 may be positioned within the elongated body portion 202 to fluidly isolate the proximal cavity 212 from the distal cavity 216. In some cases, the wall 222 may extend generally perpendicular to the longitudinal axis 230 of the mounting adaptor 200, although this is not required. The wall 222 may extended at an angle if desired. In the example shown, the wall 222 includes a proximally facing surface 224 adjacent to the proximal cavity 212 and a distally facing surface 226 adjacent the distal cavity 216. As will be described in more detail below, the wall 222 may be configured to conduct heat from the distally facing surface 226 to the proximally facing surface 224.

In some cases, the mounting adaptor 200 may be formed from a thermally conductive material to facilitate the transfer of heat from water within the distal cavity 216 to a temperature sensor assembly outside of the tank (e.g. in the proximal cavity 212). It is contemplated that the mounting adaptor 200 may be formed from a thermally conductive metal, polymer, composite, etc., as desired. The mounting adaptor 200 may be formed as a one piece monolithic body or as two or more components fixedly secured to one another.

FIG. 8 is a partial cross-sectional view of the illustrative mounting adaptor 200 of FIGS. 6-7 mounting a non-immersion type temperature sensor mounting bracket 300 to an immersion type water heater tank 310. The temperature sensor mounting bracket 300 may be similar in form and function the temperature sensor mounting brackets 32, 132 described above. The temperature sensor mounting bracket 300 may include a proximal component containing region 308 and a distal sensor containing region 302. The sensor portion 302 forming an elongated stem which extends distally from the component retaining region 308. The sensor portion 302 may include an externally threaded region 304 configured to engage or cooperate with the proximal portion 208 of the mounting adaptor 200. However, as described above, other coupling mechanisms may be used as desired. A temperature sensor assembly 306 including a temperature sensor 309 is disposed within a cavity of the sensor portion 302. The temperature sensor assembly 306 may be similar in form and function to temperature sensor assemblies 41, 141 described above. For example, while the temperature sensor assembly 306 is illustrated as contacting the proximally facing surface 224 of the wall 222 of the mounting adaptor 200, it is contemplated that the temperature sensor assembly 306 may be spaced from the proximally facing surface 224 in a similar manner to temperature sensor assembly 141. In some cases, the sensor portion 302 and the temperature sensor assembly 306 may form a non-immersion sensor assembly. However, it is contemplated that the temperature sensor assembly 306 may be provided with features that allow it to be directly secured relative to a water tank without temperature sensor mounting bracket 300.

The water tank 310 may be formed from an outer insulating shell 312 and an inner water holding tank wall 314. A layer of insulation 316 may be positioned between the shell 312 and the tank 314. Water 318 is stored within the tank 314. A through-hole 320 may extend from an inner surface of the tank wall 314 to an outer surface of the tank wall 314 to fluidly couple the storage tank 310 to a mounting spud 322 and provide access for an immersion type temperature sensor (see FIG. 5). The mounting spud 322 may be configured to couple with an immersion type temperature sensor. For example, the mounting spud 322 may include a plurality of internal threads 324 configured to engage an immersion temperature sensor assembly and to bring the immersion temperature sensor assembly into fluid contact with the water 318 within the tank 310.

It may be desirable to retrofit an immersion type water tank 310 configured for use with an immersion temperature sensor assembly with a non-immersion temperature sensor assembly. Doing so may allow for the standardization of components across water heaters. For example, a contractor to carry just non-immersion type temperature sensors yet still be able to service water heater design for non-immersion type temperature sensors and water heaters designed for immersion type temperature sensors. The mounting spud 322 may not extend the entire length between the outer shell 312 and the tank wall 314. A hollow plug or flange 326 may extend from a point outside of the shell 312 towards and surrounding an outer portion of the mounting spud 322. This may help prevent insulation 316 from blocking the mounting spud 322 and to provide a guide for securing components relative to the mounting spud 322.

Mounting adaptor 200 may be configured to be coupled with the mounting spud 322 of the immersion type water tank to provide a water tight seal between the holding tank wall 314 and the mounting adaptor 200. For example, the external threads 220 of the distal portion 210 of the mounting adapter 200 may be threadably engaged with the internal threads 324 of the mounting spud 322 via external threads 220. Water 318 may flow from the tank 310 and into the distal cavity 216 via through-hole 320. However, the wall 222 in the mounting adaptor 200 may provide a water tight seal to prevent water 318 from leaking from the tank 310. Also, the thermal conductivity of the wall 222 may allow the temperature sensor assembly 306 to determine a temperatures of the water 318 within the distal cavity 216 and thus the tank 310 without being immersed in the water 318. In some cases, the sensor portion 302 of the temperature sensor mounting bracket 300 may be threadably engaged via external threads 304 with the internal threads 214 of the proximal sensor portion 208 of the mounting adaptor 200 to position the temperature sensor assembly 306 at least partially within the proximal cavity 212 of the mounting adaptor 200. In some cases, when the non-immersion temperature sensor mounting bracket 300 is fully secured via the threads 304, 214, the temperature sensor 309 may contact or touch the proximally facing surface 224. In other cases, when the non-immersion temperature assembly 300 is fully secured via the threads 304, 214, the temperature sensor 309 may be spaced a distance from the proximally facing surface 224. The wall 222 may be configured to thermally conducts heat from water within the distal cavity 216 from the distally facing surface 226 to the proximally facing surface 224, where the heat can be measured at the temperature sensor 309 thus allowing a non-immersion sensor assembly to be used with a tank designed for an immersion type sensor assembly.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

We claim:

1. A mounting adaptor for mounting a non-immersion sensor assembly to a water heater tank that has a through hole into the water heater tank and a corresponding mounting spud for mounting an immersion sensor assembly to the water heater tank with the immersion sensor assembly extending through the through hole and immersed in the water in the water heater tank, the mounting adaptor comprising:
   a proximal end and an opposing distal end;
   a proximal cavity extending from the proximal end toward the distal end;
   a distal cavity extending from the distal end toward the proximal end;
   a wall fluidly isolating the proximal cavity from the distal cavity;
   the proximal cavity configured to receive at least part of the non-immersion sensor assembly; and
   a mounting structure that is configured to couple the mounting adaptor to the mounting spud of the water heater tank such that the distal cavity of the mounting adaptor is exposed to water in the water heater tank via the through hole into the water heater tank, wherein at least some portion of the mounting structure is distal to the wall.

2. The mounting adaptor of claim 1, wherein the mounting structure comprises distal threads on an outer surface of the mounting adaptor that are configured to cooperate and form a water tight seal with the mounting spud of the water heater tank.

3. The mounting adaptor of claim 1, wherein the proximal cavity of the mounting adaptor comprises proximal threads on an inner surface defining the proximal cavity, wherein the proximal threads are configured to cooperate with corresponding threads on an outer surface of the non-immersion sensor assembly.

4. The mounting adaptor of claim 3, wherein the non-immersion sensor assembly comprises a temperature sensor that is spaced from the wall when the non-immersion sensor assembly is fully secured via the proximal threads.

5. The mounting adaptor of claim 3, wherein the non-immersion sensor assembly comprises a temperature sensor that is touching the wall when the non-immersion sensor assembly is fully secured via the proximal threads.

6. The mounting adaptor of claim 1, wherein the wall has a proximal facing surface and a distal facing surface, and wherein the wall is thermally conductive and conducts heat from the distal facing surface to the proximal facing surface.

7. The mounting adaptor of claim 1, wherein the mounting adaptor is one-piece.

8. The mounting adaptor of claim 1, wherein the mounting adaptor is formed from a metal.

9. A mounting adaptor for mounting a mounting bracket to a water heater tank, the mounting adaptor comprising:
- a thermally conductive elongated body extending along a longitudinal axis, the elongated body comprising:
  - a sensor portion comprising a proximal cavity extending from a proximal end of the elongated body towards a distal end of the elongated body, the sensor portion configured to receive a temperature sensor at least partially within the proximal cavity;
  - a stem portion comprising a distal cavity extending from the distal end of the elongated body towards the proximal end of the elongated body, the stem portion configured to engage a spud of the water heater tank; and
  - a wall positioned between and separating the proximal cavity and the distal cavity, the wall extending generally orthogonal to the longitudinal axis of the elongated body.

10. The mounting adaptor of claim 9, wherein the sensor portion comprises a mounting mechanism configured to mount the mounting bracket to the mounting adaptor.

11. The mounting adaptor of claim 10, wherein the mounting mechanism comprises threads disposed along an inner surface of the proximal cavity for threadably engaging corresponding threads on an outer surface of the mounting bracket.

12. The mounting adaptor of claim 9, wherein the stem portion comprises threads along an outer surface of the stem portion for threadably engaging the spud of the water heater tank to secure the mounting adaptor to the water heater tank.

13. A water heater sensor assembly, comprising:
- a non-immersion sensor mounting bracket having a proximal region and a distal region, with a temperature sensor housed by the distal region, the distal region having threads along an outer surface;
- a mounting adaptor comprising:
  - a proximal end and an opposing distal end;
  - a proximal cavity extending from the proximal end toward the distal end;
  - a distal cavity extending from the distal end toward the proximal end;
  - a wall fluidly isolating the proximal cavity from the distal cavity;
  - the proximal cavity comprises proximal threads on an inner surface that are configured to cooperate with threads along the outer surface of the non-immersion sensor mounting bracket; and
  - distal threads on an outer surface of the mounting adaptor configured to cooperate and form a water tight seal with a mounting spud of a water heater tank, wherein at least some portion of the distal threads are distal to the wall.

14. The water heater sensor assembly of claim 13, wherein the temperature sensor of the non-immersion sensor mounting bracket is spaced from the wall when the non-immersion sensor assembly bracket is fully secured via the proximal threads.

15. The water heater sensor assembly of claim 13, wherein the temperature sensor of the non-immersion sensor mounting bracket is touching the wall when the non-immersion sensor assembly bracket is fully secured via the proximal threads.

16. The water heater sensor assembly of claim 13, wherein the wall has a proximal facing surface and a distal facing surface, and wherein the wall is thermally conductive and conducts heat from the distal facing surface to the proximal facing surface.

17. The water heater sensor assembly of claim 13, wherein the mounting adaptor is one-piece.

18. The water heater sensor assembly of claim 13, wherein the mounting adaptor is formed from a metal.

19. The water heater sensor assembly of claim 13, wherein the non-immersion sensor mounting bracket comprises a component retaining region and an elongated stem region extending from the component retaining region, wherein the elongated stem region includes the distal region that houses the temperature sensor.

20. The water heater sensor assembly of claim 19, wherein the component retaining region and an elongated stem region are one piece and comprise a polymeric material.

* * * * *